United States Patent
Friggstad

(10) Patent No.: US 9,357,693 B2
(45) Date of Patent: *Jun. 7, 2016

(54) AIR CART METERING SYSTEM

(71) Applicant: CNH Canada, Ltd., Saskatoon (CA)

(72) Inventor: Terrance Alan Friggstad, Grasswood (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 15 days.

This patent is subject to a terminal disclaimer.

(21) Appl. No.: 14/167,186

(22) Filed: Jan. 29, 2014

(65) Prior Publication Data

US 2014/0130724 A1    May 15, 2014

Related U.S. Application Data

(62) Division of application No. 12/987,673, filed on Jan. 10, 2011, now Pat. No. 8,666,608.

(51) Int. Cl.
*A01B 79/00* (2006.01)
*A01C 15/04* (2006.01)
*A01C 7/20* (2006.01)
*A01C 15/00* (2006.01)

(52) U.S. Cl.
CPC .............. *A01C 7/20* (2013.01); *A01B 79/005* (2013.01); *A01C 15/00* (2013.01); *A01C 15/04* (2013.01)

(58) Field of Classification Search
CPC ...... A01B 79/005; A01B 79/00; A01C 15/00; A01C 15/04; A01C 7/20; A01C 7/00

USPC .............. 701/50; 111/170, 173–188
See application file for complete search history.

(56) References Cited

U.S. PATENT DOCUMENTS

| | | | |
|---|---|---|---|
| 2,296,014 A | 9/1942 | Benzel, Sr. et al. | |
| 3,658,212 A | 4/1972 | Ullberg | |
| 4,964,545 A | 10/1990 | Mooshammer | |
| 5,092,267 A | 3/1992 | Hajek | |
| 5,154,326 A | 10/1992 | Chang et al. | |
| 5,178,333 A | 1/1993 | Barber et al. | |
| 5,516,253 A | 5/1996 | Linscheid et al. | |
| 5,655,692 A | 8/1997 | Navin et al. | |
| 6,776,569 B1 | 8/2004 | McMahon et al. | |
| 7,025,555 B2 | 4/2006 | Hanig | |
| 7,040,242 B2 | 5/2006 | Memory | |
| 7,134,830 B2 | 11/2006 | Wood | |
| 8,666,608 B2 * | 3/2014 | Friggstad | 701/50 |
| 2009/0090283 A1 * | 4/2009 | Riewerts | 111/184 |
| 2012/0008457 A1 | 1/2012 | Neier et al. | |

* cited by examiner

*Primary Examiner* — Christopher J Novosad
(74) *Attorney, Agent, or Firm* — Rebecca L. Henkel

(57) ABSTRACT

An agricultural cart including a product metering system comprising an auger assembly extending generally along an axis non-parallel to a horizontal plane and non-perpendicular to the horizontal plane, and a holding chamber disposed at an upstream end of the auger assembly and configured to reduce pulsations within a flow of agricultural product from the auger assembly. The agricultural cart also includes an air source coupled to the product metering system and configured to transfer the agricultural product to an agricultural implement via an airflow.

20 Claims, 4 Drawing Sheets

AIR CART METERING SYSTEM

CROSS-REFERENCE TO RELATED APPLICATION

This application is a divisional of U.S. patent application Ser. No. 12/987,673, entitled "AIR CART METERING SYSTEM", filed Jan. 10, 2011, which is hereby incorporated by reference in its entirety.

BACKGROUND

The invention relates generally to ground working equipment, such as agricultural equipment, and more specifically, to a system configured to coordinate product delivery to an agricultural implement.

Generally, seeding implements are towed behind a tractor or other work vehicle via a mounting bracket secured to a rigid frame of a planter or seeder. These seeding implements typically include one or more ground engaging tools or openers that form a seeding path for seed deposition into the soil. The openers are used to break the soil to enable seed deposition. After the seeds are deposited, each opener is followed by a packer wheel that packs the soil on top of the deposited seeds.

In certain configurations, an air cart is used to meter and transport product (e.g., seeds, fertilizer, etc.) to ground engaging tools within the seeding implement. Certain air carts include a metering system configured to deliver metered quantities of product into an airflow that transfers the product to the openers. As will be appreciated, it may be desirable to terminate a flow of product to certain openers when those openers are located over areas where product has already been deposited, or in areas where it is undesirable to deposit the product. Unfortunately, certain metering systems provide a substantially equal flow of product to each ground engaging tool. Consequently, the ground engaging tools may deposit seed in swaths of soil that have already been planted, thereby resulting in wasted product.

BRIEF DESCRIPTION

In accordance with one embodiment, an agricultural cart includes a product metering system comprising an auger assembly extending generally along an axis non-parallel to a horizontal plane and non-perpendicular to the horizontal plane, and a holding chamber disposed at an upstream end of the auger assembly and configured to reduce pulsations within a flow of agricultural product from the auger assembly. The agricultural cart also includes an air source coupled to the product metering system and configured to transfer the agricultural product to an agricultural implement via an airflow.

In accordance with another embodiment, an agricultural cart includes a storage tank configured to store agricultural product, a product metering system coupled to the storage tank and configured to distribute the agricultural product in metered quantities, wherein the product metering system comprises a plurality of auger assemblies configured to transfer the agricultural product to a respective plurality of primary lines, and each primary line is configured to transfer the agricultural product to a plurality of secondary lines extending to respective row units within an agricultural implement The agricultural cart also includes an air source coupled to the product metering system and configured to transfer the agricultural product to the row units via an airflow.

In accordance with a further embodiment, an agricultural cart includes a storage tank configured to store agricultural product, a product metering system coupled to the storage tank and configured to distribute the agricultural product in metered quantities, wherein the product metering system comprises a plurality of auger assemblies, and each auger assembly is configured to operate at a different turn rate. The agricultural cart also includes an air source coupled to the product metering system and configured to transfer the agricultural product to an agricultural implement via an airflow.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
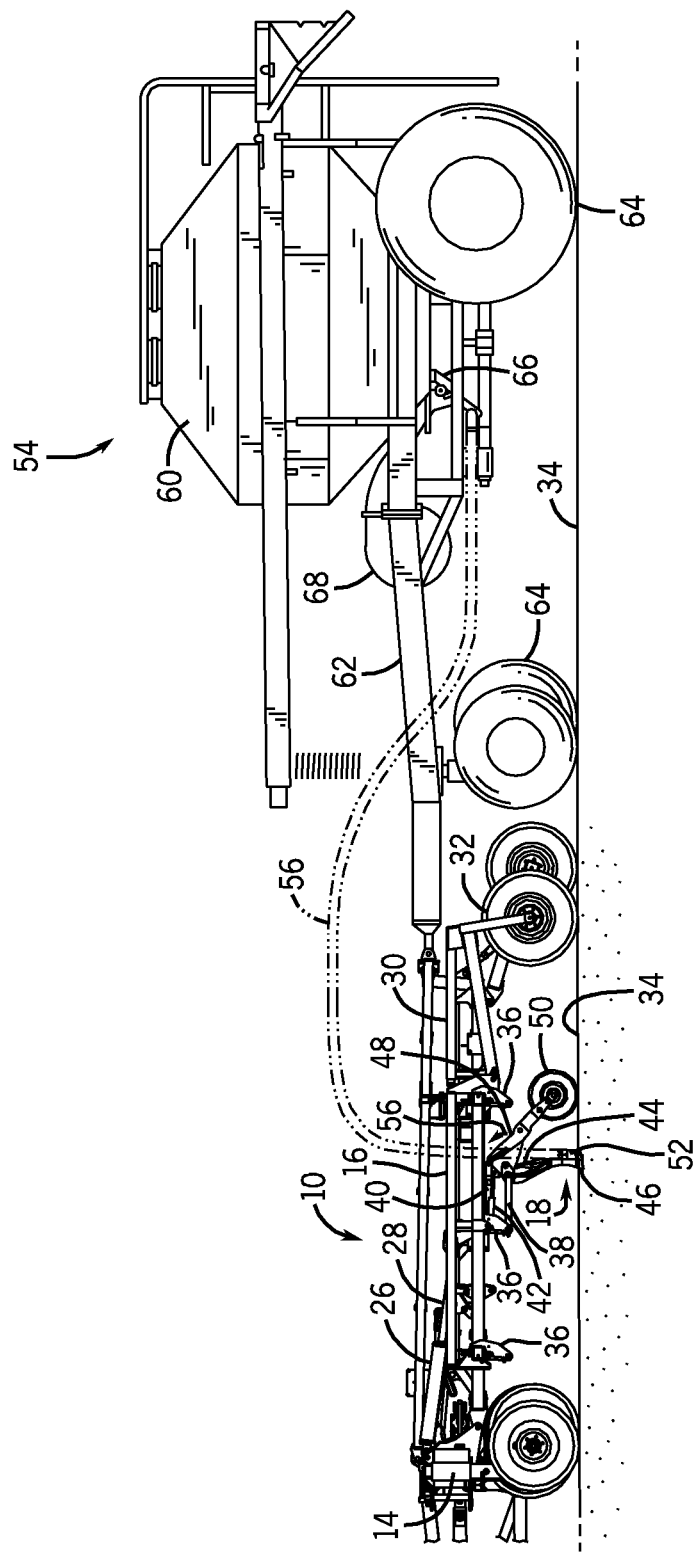
FIG. 1 is a side view of an implement coupled to an air cart, including a metering system configured to regulate product delivery to ground engaging tools.

FIG. 1 is a side view of an implement coupled to an air cart including a product metering system configured to regulate product delivery to ground engaging tools. In the illustrated embodiment, the implement 10 includes a tool frame 16 in a working position. Consequently, with the frame 16 in the working position, the row units 18 engage the soil, thereby facilitating seed deposition into the soil. As illustrated, the implement 10 includes a wheel assembly 30 having a wheel 32 which contacts the soil surface 34. Contact between the wheel 32 and the soil surface 34 may drive the tool frame 16 toward an orientation substantially parallel to the soil surface 34. Consequently, each row unit 18 may be properly positioned for seed and/or fertilizer deposition into the soil. In the present embodiment, the row units 18 are coupled to respective mounting brackets 36 on the tool frame 16. While a single row unit 18 is shown for clarity, it should be appreciated that a row unit may be coupled to each mounting bracket 36 on the frame 16. For example, in certain embodiments at least 2, 4, 6, 8, 9, 10, 12, 14, 16, 18, 20, or more row units 18 may be coupled to each tool frame 16.

As illustrated, the row unit 18 includes a first member 38, a second member 40, and a tool actuator such as an actuating cylinder 42 (e.g., hydraulic and/or pneumatic piston-cylinder assembly) coupled to the mounting bracket 36. The cylinder 42 may be fluidly coupled to a fluid power supply that provides a flow of pressurized fluid which displaces a piston rod extending from the cylinder. It should be appreciated that the fluid power supply may be hydraulic or pneumatic, thereby powering the hydraulic or pneumatic cylinder 42. The mounting bracket 36 is configured to interface with the tool frame 16, thereby securing the row unit 18 to the implement 10. For instance, multiple row units 18 may be mounted in parallel along the tool frame 16. In the present configuration, the first member 38, the second member 40, and the mounting bracket 36 form elements of a parallel linkage, also known as a four bar linkage. As will be appreciated, components of the row unit 18, such as the mounting bracket 36, first member 38 and second member 40, may be made of any suitable material, such as steel.

The cylinder 42 is attached to a shank 44 via a pin at the end of the piston rod. The shank, in turn, is coupled to the ground engaging tool 46 via fasteners which enable height adjustment of the ground engaging tool 46 such that seeding depth may be varied. A pin is coupled to the first member 38 and the shank 44, enabling the shank 44 to pivotally rotate about the pin as the cylinder 42 extends and retracts. Accordingly, the ground engaging tool 46 moves in a downward or upward direction based upon extension or retraction of the cylinder 42. Consequently, the tool actuator/cylinder 42 is configured to vary a penetration depth of the ground engaging tool 46 into the soil 34 independently of a distance between the tool frame 16 and the soil 34. The shank 44 may feature several holes to receive a pin coupling the end of the cylinder 42 to the shank 44. The adapter holes may be used to adjust the angle of the cylinder 42 with respect to the parallel linkage assembly, thereby changing the angle and magnitude of cylinder forces.

In the present embodiment, partially relieving pressure to a cap end of the cylinder 42 will reduce the downward force applied by a packer wheel assembly 48. In addition, applying pressure to a rod end of the cylinder 42 will raise the packer wheel assembly 48, and will eventually lift the packing wheel 50 from the terrain. As will be appreciated, the packer wheel assembly 48 is configured to establish a desired penetration depth of the ground engaging tool 46 into the soil 34. In the present embodiment, the packer wheel assembly 48 may facilitate height adjustment of the packer wheel 50, in the form of a fastener and slot or an equivalent structure. To facilitate seed deposition during operation, the ground engaging tool 46 is coupled to a seed tube 52. As discussed in detail below, the seed tube is configured to receive a flow of product from a product metering system.

As a result of this exemplary row unit configuration, the ground engaging tool 46 may be transitioned between a working position and a non-working position based on extension and retraction of the tool actuator/cylinder 42. As previously discussed, retraction of the cylinder 42 induces the ground engaging tool 46 to rotate in an upward direction, thereby extracting the ground engaging tool 46 from the soil, and transitioning the tool 46 toward the non-working position. Moving each ground engaging tool 46 into the non-working position facilitates transport of the seeding implement 10 by reducing the draft force associated with each tool 46. In addition, a flow of product (e.g., seeds, fertilizer, etc.) to the row unit 18 may be temporarily suspended when the ground engaging tools 46 are in the non-working position. Consequently, the seeding implement 10 may be moved across a field (e.g., turned at a headland) without depositing product within the soil.

Conversely, each ground engaging tool 46 may be transitioned toward the working position by extending the tool actuator/cylinder 42, thereby driving the ground engaging tool 46 to rotate in a downward direction. As will be appreciated, while the ground engaging tool 46 is in the working position, the tool 46 may excavate a trench into the soil as the implement 10 traverses the field. Once a trench has been excavated, the product delivery system may deposit seeds and/or fertilizer into the soil via the seed tube 52. The packer wheel 50 may then close the trench, thereby forming a seed row suitable for crop development.

In certain embodiments, the ground engaging tools 42 may be fixed relative to the tool frame 16. In alternative embodiments, the orientation of the tool frame 16 may be fixed relative to the tool bar 14. In such embodiments, the tool actuators 42 may transition the ground engaging tools 42 between the working and non-working positions.

As illustrated, the air cart 54 is coupled to the implement 10 via the frame 16. In the present embodiment, product (e.g., seeds and/or fertilizer) is transferred from the air cart 54 to the row unit 18 via a flow of air passing through a pneumatic seed distribution hose 56. For implements 10 with multiple row units 18, separate hoses 56 and/or a distribution system may be employed to transfer product from the air cart 54 to each row unit 18. The illustrated air cart 54 includes a storage tank 60, a frame 62, wheels 64, the product metering system 66 and an air source 68. In certain configurations, the storage tank 60 includes multiple compartments for storing various flowable particulate materials. For example, one compartment may include seeds, and another compartment may include a dry fertilizer. In such configurations, the air cart 54 is configured to deliver both the seeds and fertilizer to the implement 10. The frame 62 includes a towing hitch configured to couple to the implement 10 or tow vehicle. Seeds and/or fertilizer within the storage tank 60 are gravity fed into the product metering system 66.

In the present embodiment, the product metering system 66 includes meter augers to regulate the flow of material from the storage tank 60 into an air flow provided by the air source 68. The air flow then carries the material to the implement 10, thereby supplying the row units 18 with seeds and/or fertilizer for deposition within the soil. As discussed in detail below, the metering system 66 may include multiple augers configured to independently regulate product flow to various groups of row units 18, thereby providing a substantially uniform distribution of product into the soil.

Figure 2:
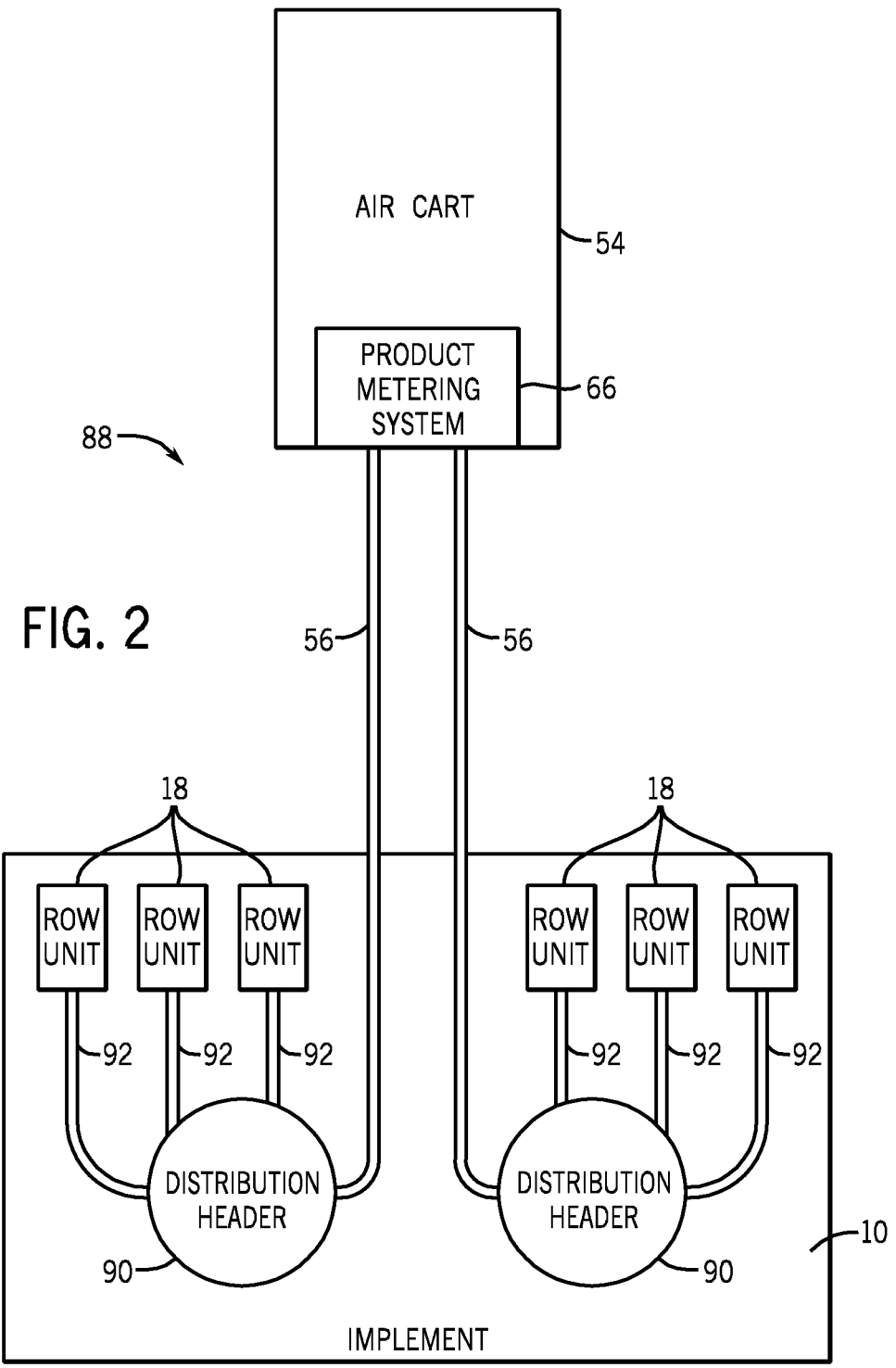
FIG. 2 is a schematic diagram of an air cart coupled to an implement, as shown in FIG. 1, illustrating a metering system including multiple product flow paths.

FIG. 2 is a schematic diagram of an air cart 54 coupled to an implement 10, as shown in FIG. 1, illustrating a distribution system 88 including a product metering system 66 and multiple product flow paths. In the illustrated embodiment, the distribution system 88 includes the product metering system 66, primary distribution hoses 56, distribution headers 90, and secondary distribution hoses 92. Product is delivered from the air cart 54 to row units 18 using the distribution system 88. For example, product may initially be located in air cart 54. The distribution system 88 transfers the product using the product metering system 66 to primary distribution hoses 56. Next, the primary distribution hoses 56 transfer the product to distribution headers 90 positioned on an implement 10. Finally, the distribution headers 90 transfer the product through secondary distribution hoses 92 to deliver the product to row units 18 of implement 10.

The air cart 54 may contain one product or multiple products that are transferred using the distribution system 88. For example, certain distribution systems are configured to mix multiple products, and transfer the products together to the row units 18. Such systems may be known as "single shot" distribution systems. Alternatively, certain distribution systems are configured to transfer product separately to the row units 18. Such systems may be known as "double shot" systems. The air cart 54, as shown in FIG. 2, includes a single shot distribution system 88. However, other embodiments may include double shot distribution systems.

The product metering system 66 controls the quantity of product that is transferred to the primary distribution hoses 56. The product metering system 66 includes a variety of features which are described in greater detail below in relation to FIGS. 3 and 4. For example, the product metering system 66 may contain one or more augers that transfer the product from the air cart 54 to the primary distribution hoses 56. In configurations that employ multiple augers, the augers may be configured to operate collectively or individually. For example, if the implement passes over a swath of soil that is partially planted, the distribution system may activate certain augers to deliver product to the unplanted sections while deactivating other augers to block product delivery to the planted sections. In this manner, the implement may provide a substantially even distribution of product to the soil, thereby substantially reducing wasted product associated with double-planting certain areas of the soil. A controller may be used to control the operation of the augers. The controller may control whether augers are started or stopped, and/or determine a turn rate for each individual auger. In addition, the augers may be positioned at a certain angle to inhibit loss of product when the product metering system 66 is stopped. The augers may also contain a holding chamber to provide a steady flow of product to the primary distribution hoses 56.

The primary distribution hoses 56 are connected to the product metering system 66 and configured to receive product from the product metering system 66. Although two primary distribution hoses 56 are depicted, any number of hoses may be used. For example, some embodiments may only use one primary distribution hose 56, while other embodiments use 3, 4, 5, 6, 7, 8, 9, 10 or more primary distribution hoses 56. The number and length of primary distribution hoses 56 may be at least partially dependent on the output of an air source, the type of product being used, or the configuration of the implement 10 connected to the primary distribution hoses 56.

The distribution headers 90 receive the product from the primary distribution hoses 56. Generally, the number of distribution headers 90 will match the number of primary distribution hoses 56. However, some embodiments may incorporate multiple primary distribution hoses 56 into a single distribution header 90, or one primary distribution hose 56 may split to go to multiple distribution headers 90. In addition, there may be any number of distribution headers 90. For example, some embodiments may use only one distribution header 90, while other embodiments use 3, 4, 5, 6, 7, 8, 9, 10 or more distribution headers 90. The distribution headers 90 cause the product to be distributed among secondary distribution hoses 92. While three secondary distribution hoses 92 are depicted, any number of secondary distribution hoses 92 may be used.

The secondary distribution hoses 92 provide a flow path for the product to be transferred from the distribution header 90 to the row units 18. Generally there will be a secondary distribution hose 92 for each row unit 18. However, there may be multiple secondary distribution hoses 92 going to a single row unit 18, or one secondary distribution hose 92 could go to multiple row units 18. For example, a double shot system, where multiple products are transferred separately, may have multiple secondary distribution hoses 92 going to a single row unit 18.

In certain embodiments, the distribution system 88 enables individual or combined control of product distribution from the air cart 54 to the primary distribution hoses 56. For example, the distribution system 88 may individually stop, start, and/or regulate product delivery rates for each primary distribution hose 56. In addition, the distribution system 88 may block the flow of product when portions of the product metering system 66 are stopped.

Figure 3:
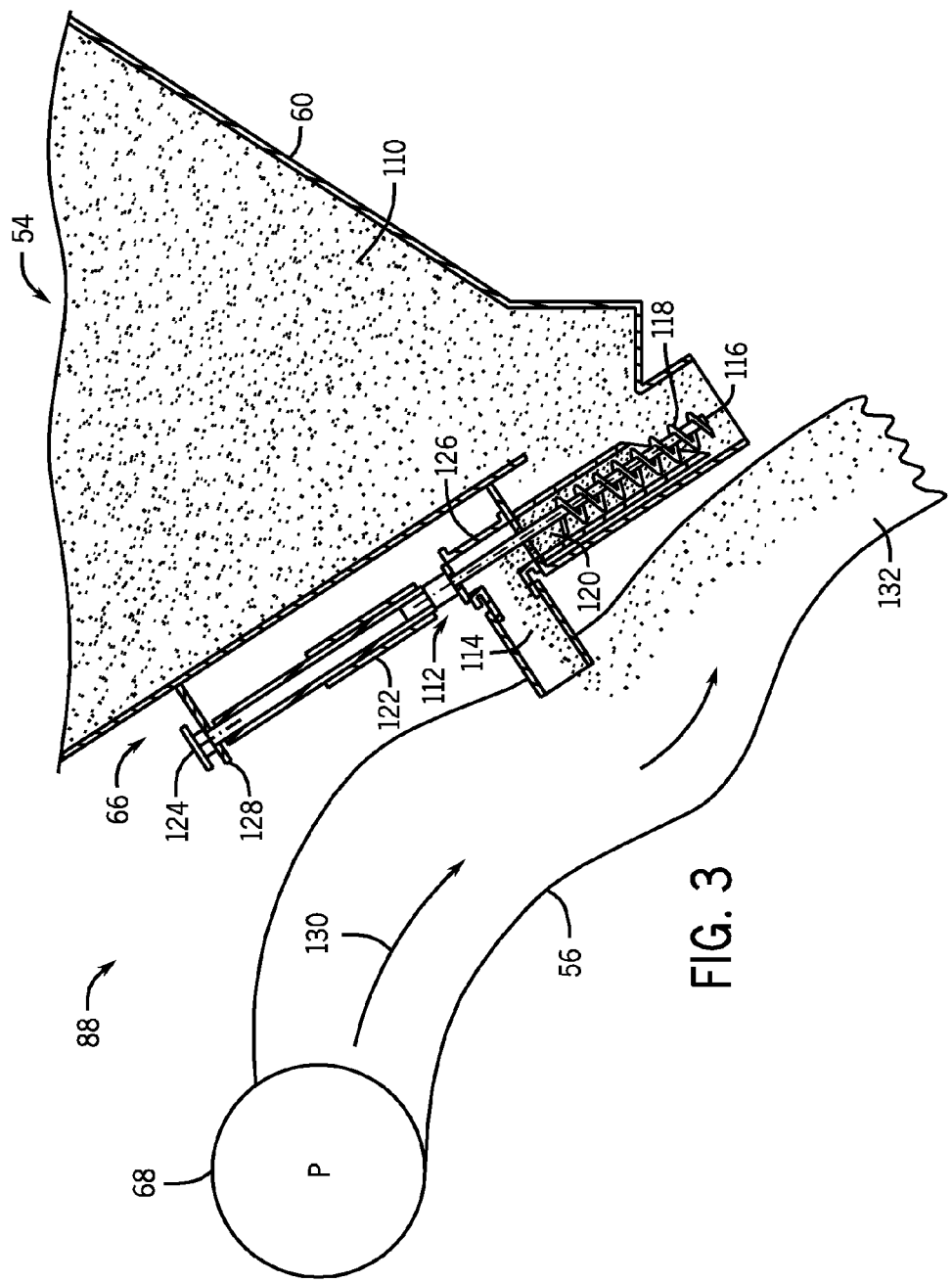
FIG. 3 is a schematic diagram of an exemplary metering system which may be employed with the air cart of FIG. 1.

Turning now to FIG. 3, a schematic diagram of a product metering system 66 is shown, which may be utilized with the air cart 54 of FIG. 1. As illustrated, a distribution system 88 transfers a product 110 (e.g., seeds, fertilizer, etc.) from an air cart 54 through the distribution hose 56. The air cart 54 contains the product 110 within a storage tank 60. The distribution system 88 uses a product metering system 66 including an auger assembly 112 to transfer the product 110 to an outlet port 114 of the auger assembly 112. As the product 110 exits the outlet port 114, an airflow from the air source 68 transfers the product 110 through the distribution hose 56.

The product metering system 66 transfers the product 110 from the storage tank 60 to the distribution hose 56 using the auger assembly 112. The auger assembly 112 includes a lower end 116, a helicoid flange 118, a holding chamber 120, the outlet port 114, a drive shaft 122, a drive sprocket 124, and an auger tube 126. The drive shaft 122 is positioned within the auger tube 126, and the helicoid flange 118 is disposed about the drive shaft 122. In this configuration, as the drive shaft 122 rotates, product 110 within the auger tube 126 flows toward the outlet port 114. The auger tube 126 contains the product 110 until the product 110 reaches the outlet port 114. As illustrated, the outlet port 114 connects directly to the distribution hose 56. Consequently, as the product flows out of the outlet port 114, an air stream 130 from the air source 68 mixes with the product 110 to create an air/product mixture 132. The mixture 132 then flows to the row units of the implement via the distribution hose 56. The air source 68 may be a pump or blower powered by an electric or hydraulic motor, for example.

The helicoid flange 118 extends along the drive shaft 122 from the lower end 116 of the auger assembly 112 to the holding chamber 120. The drive shaft 122 is turned by rotating the drive sprocket 124. Rotating the drive shaft 122 induces the helicoid flange 118 to spin, thereby transferring the product 110 up the helicoid flange 118 to the holding chamber 120. As will be appreciated, due to the shape of the helicoid flange 118, the flow of product will be substantially uneven. Consequently, the holding chamber 120 enables product 110 to accumulate until the product 110 reaches the outlet port 114. As a result, a substantially constant flow of product will be transferred to the distribution line 56, thereby reducing pulsations from the auger assembly 112.

To hold the auger assembly 112 in place while turning, a bracket 128 mounts the auger assembly 112 to the storage tank 60. The auger assembly 112 is mounted on the side of the storage tank 60 at an angle. This angle is depicted in FIG. 3 as matching the angle of the side of the storage tank 60. However, other embodiments may include any angle between an angle parallel to a horizontal plane and an angle perpendicular to the horizontal plane. For example, the angle could be between 0 and 90 degrees, where 0 degrees would place the auger assembly 112 laying on its side, parallel to the horizontal plane, and 90 degrees would place the auger assembly 112 in a vertical orientation, perpendicular to the horizontal plane. In this configuration, when rotation of the drive shaft is stopped, the product 110 will be held in the holding chamber 120 by the force of gravity. Consequently, the possibility of product flowing into the air stream 130 may be substantially reduced or eliminated.

As illustrated, the auger assembly 112 is connected to the distribution hose 56 via the outlet port 114. In other embodiments, the product metering system 66 may include multiple auger assemblies, where each auger assembly is connected to a respective distribution hose. The drive sprocket 124 may be driven by a belt system, where a belt loops around the drive sprocket 124 and a drive unit. Rotation of the drive unit will induce the drive sprocket 124 to rotate, thereby rotating the drive shaft 122. In certain embodiments, the product metering system 66 may include multiple auger assemblies. In such embodiments, each auger assembly may be connected to a synchronization device, such as the belt system, to turn all auger assemblies at the same time. The belt system may be used to start, stop and control the turn rate of an individual drive sprocket 124, or a collective group of auger assemblies.

Alternatively, certain embodiments may employ a motor to drive the auger assembly 112, or multiple motors if the metering system 66 includes more than one auger assembly 112. Like the belt system, the motors may be used to start, stop and control the turn rate of the drive sprockets 124. In such embodiments, each auger assembly 112 may be controlled individually via a respective motor. Consequently, product 110 may be transferred to some distribution hoses 56, while the product 110 is blocked from being transferred to others. This arrangement may decrease the waste of product by limiting product flow to row units positioned over unplanted or unfertilized soil. Furthermore, some embodiments may have a controller to control the turn rates of each auger assembly. Controlling the turn rates effectively controls the amount of product that flows to the distribution hose 56, and in turn the amount of product that flows to the row units. For example, a metering system 66 may include four auger assemblies. Three of the auger assemblies may distribute product 110 to distribution headers that each have eight secondary distribution hoses extending to respective row units. The fourth auger assembly may distribute product 110 to a distribution header with nine secondary distribution hoses, each delivering product to a respective row unit. Therefore, the fourth auger turn rate may be set to approximately 112% of the turn rate of the other three auger assemblies, thereby allowing each auger assembly to deliver approximately the same quantity of product 110 to each of the row units.

Figure 4:
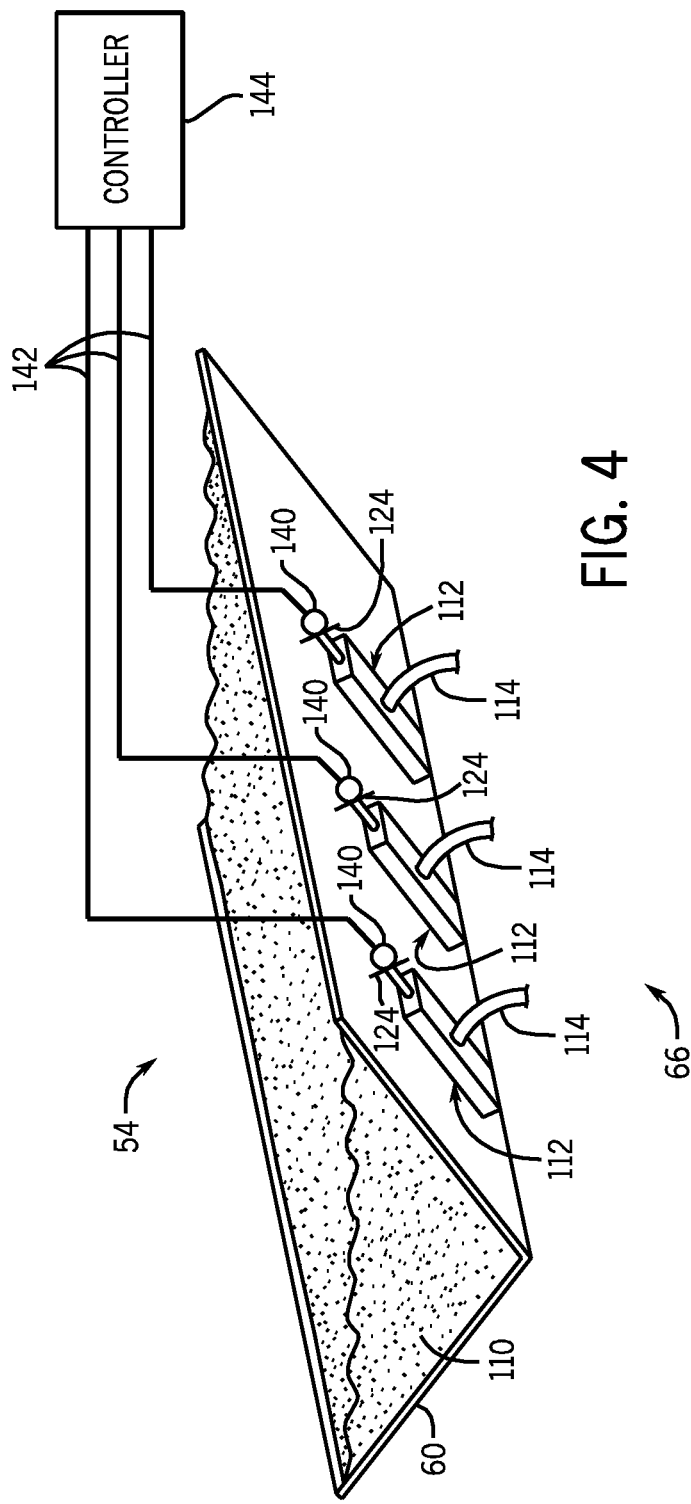
FIG. 4 is a perspective view of an exemplary metering system, using multiple augers, which may be employed with the air cart of FIG. 1.

FIG. 4 is a perspective view of a product metering system 66 including multiple auger assemblies 112, which may be employed within the air cart 54 of FIG. 1. As illustrated, the product metering system 66 includes three auger assemblies 112. Alternative embodiments may include more or fewer auger assemblies. For example, certain embodiments may include 1, 2, 3, 4, 5, 6, or more auger assemblies 112. In the illustrated embodiment, each auger assembly 112 includes a motor 140, and a control line 142 extending between the motor 140 and a controller 144.

Similar to the auger assembly 112 described above with reference to FIG. 3, each auger assembly 112 includes an outlet port 114 and a drive sprocket 124. As previously discussed, each outlet port 114 may be connected to a distribution hose to deliver the product 110 to row units on an implement. Motors 140 are connected to the drive sprockets 124 of each auger assembly 112, and the control lines 142 communicatively couple the motors 140 to the controller 144. While each motor 140 is configured to drive a single auger assembly 112 in the illustrated embodiment, it should be appreciated that alternative embodiments may include motors 140 configured to drive 1, 2, 3, 4, 5, or more auger assemblies 112.

The controller 144 is configured to send signals through control lines 142 to start and stop the motors 140, which in turn start and stop the drive sprockets 124 on the auger assemblies 112. When the drive sprockets 124 are turning, the product 110 is delivered to the distribution system via the outlet port 114. The controller 144 may also send specific signals to turn auger assemblies 112 at a particular turn rate. This turn rate may be varied to deliver a calculated amount of product over a period of time, thereby ensuring that the appropriate quantity of product is delivered to the row units. The controller 144 may control the auger assemblies 112 to function collectively, or it may control the auger assemblies 112 to function separately, as desired for a particular application. In certain embodiments, the controller 144 is configured to control the auger assemblies 112 based on predetermined flow rates. Alternatively, the controller 144 may enable user input to control the auger assemblies 112. In further embodiments, the controller 144 may receive inputs from a positioning system, such as a Global Positioning System, and automatically regulate product flow rates from each auger assembly 112 based on the measured position.

By individually controlling the product flow rate from each auger assembly 112, the controller 144 may enable the implement to deliver a substantially even distribution of product throughout a field. For example, if a first primary distribution hose 56 extends to a distribution header 90 having four row units 18, while a second primary distribution hose 56 extends to a distribution header 90 having three row units 18, the controller 144 may provide an increased flow rate to the first primary distribution hose 56. As a result, each row unit attached to the first and second distribution headers will receive a substantially equal flow of product. Consequently, the controller 144 may compensate for variations in product deliver system configurations. In addition, if the implement passes over a swath of soil that is partially planted, the controller 114 may activate certain auger assemblies 112 to deliver product to the unplanted sections while deactivating other auger assemblies to block product delivery to the planted sections. In this manner, the implement may provide a substantially even distribution of product to the soil, thereby substantially reducing wasted product associated with double-planting certain areas of the soil.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural cart, comprising:
a storage tank configured to store agricultural product;
a product metering system coupled to the storage tank and configured to distribute the agricultural product in metered quantities, wherein the product metering system comprises a plurality of auger assemblies, each auger assembly is configured to operate at a different turn rate, and each auger assembly comprises:
an inlet port positioned proximate to a lower end of the respective auger assembly and configured to receive the agricultural product from the storage tank;
an outlet port positioned above the inlet port and configured to deposit the agricultural product from the auger assembly into a respective primary line;
a rotatable member configured to rotate at a respective turn rate of the different turn rates to convey the agricultural product upward through the auger assembly from the inlet port toward the outlet port; and
an air source coupled to the product metering system and configured to transfer the agricultural product to an agricultural implement via an airflow.

2. The agricultural cart of claim 1, wherein each primary line is configured to transfer the agricultural product to a plurality of secondary lines extending to respective row units within the agricultural implement.

3. The agricultural cart of claim 2, wherein the turn rate of the respective rotatable member of each auger assembly is based at least in part on a number of secondary lines coupled to the respective primary line.

4. The agricultural cart of claim 1, wherein each auger assembly comprises a motor configured to drive the respective rotatable member of each auger assembly to rotate, and the product metering system comprises a controller communicatively coupled to each motor and configured to independently control the turn rate of the respective rotatable member of each auger assembly.

5. The agricultural cart of claim 4, wherein the controller is configured to start and stop the rotatable member of each auger assembly independently.

6. The agricultural cart of claim 4, wherein the controller is configured to receive an input from a positioning system and to determine the turn rate of the respective rotatable member of each auger assembly based at least in part on the input.

7. The agricultural cart of claim 1, wherein each auger assembly extends generally along an axis non-parallel to a horizontal plane and non-perpendicular to the horizontal plane.

8. An agricultural cart, comprising:
a storage tank configured to store agricultural product;
a product metering system coupled to the storage tank, wherein the product metering system comprises a plurality of auger assemblies configured to distribute the agricultural product in metered quantities and a controller configured to independently control a respective turn rate of each auger assembly, and each auger assembly comprises:
an auger tube comprising an inlet port positioned proximate to a lower end of the respective auger tube and configured to receive the agricultural product from the storage tank, and an outlet port configured to deposit the agricultural product from the auger tube into a respective primary line; and
a helicoid flange coupled to a rotatable shaft and supported within the auger tube, wherein the helicoid flange is configured to convey the agricultural product upward through the auger tube from the inlet port to the outlet port upon rotation of the rotatable shaft at the respective turn rate for the respective auger assembly; and
an air source coupled to the product metering system and configured to transfer the agricultural product to an agricultural implement via an airflow.

9. The agricultural cart of claim 8, wherein each primary line is configured to transfer the agricultural product to a plurality of secondary lines extending to respective row units within the agricultural implement.

10. The agricultural cart of claim 9, wherein the controller is configured to determine the respective turn rate of each auger assembly based at least in part on a number of secondary lines coupled to the respective primary line.

11. The agricultural cart of claim 8, wherein each auger assembly comprises a motor communicatively coupled to the controller and configured to drive the respective rotatable shaft of the auger assembly to rotate.

12. The agricultural cart of claim 8, wherein the controller is configured to instruct each auger assembly to operate at a different respective turn rate.

13. The agricultural cart of claim 8, wherein the controller is configured to start and stop rotation of the rotatable shaft of each auger assembly independently.

14. The agricultural cart of claim 8, wherein the controller is configured to receive an input from a positioning system and to determine the respective turn rate of each auger assembly based at least in part on the input.

15. The agricultural cart of claim 8, wherein each auger assembly extends generally along an axis non-parallel to a horizontal plane and non-perpendicular to the horizontal plane.

16. An agricultural cart, comprising:
a storage tank configured to store agricultural product;
a product metering system coupled to the storage tank and configured to distribute the agricultural product in metered quantities via a plurality of primary distribution lines configured to transport the agricultural product to an agricultural implement and a plurality of secondary lines extending to respective row units within the agricultural implement, wherein the product metering system comprises:
a plurality of auger assemblies;
a controller configured to separately regulate a respective delivery rate of the agricultural product from each of the auger assemblies of the plurality of auger assemblies into a corresponding primary distribution line of the plurality of primary distribution lines, wherein a first primary distribution line of the plurality of primary distribution lines is configured to transfer the agricultural product to a first number of secondary lines of the plurality of secondary lines, a second primary distribution line of the plurality of primary distribution lines is configured to transfer the agricultural product to a second number of secondary lines of the plurality of second lines, the first number of secondary lines is greater than the second number of secondary lines, and the controller is configured to regulate the respective delivery rate from each auger assembly based at least in part on the number of secondary lines coupled to the corresponding primary distribution line; and
an air source coupled to the product metering system and configured to provide an airflow to facilitate transfer of the agricultural product within the plurality of primary distribution lines toward the agricultural implement.

17. The agricultural cart of claim 16, wherein each auger assembly comprises a motor communicatively coupled to the controller, and the controller is configured to instruct the motor to start, stop, and control a turn rate of a rotatable member of the auger assembly to separately regulate the respective delivery rates.

18. The agricultural cart of claim 16, wherein the controller is configured to receive an input from a positioning system and to determine the respective delivery rate of the agricultural product from each auger assembly based at least in part on the input.

19. The agricultural cart of claim 16, wherein each auger assembly extends generally along an axis non-parallel to a horizontal plane and non-perpendicular to the horizontal plane.

20. The agricultural cart of claim 16, wherein a first auger assembly of the plurality of auger assemblies is configured to deliver the agricultural product to the first primary distribution line, a second auger assembly of the plurality of auger assemblies is configured to deliver the agricultural product to the second primary distribution line, and the controller is configured to cause the first auger assembly to deliver the agricultural product to the first primary distribution line at a first rate and to cause the second auger assembly to deliver the agricultural product to the second primary distribution line at a second rate less than the first rate to facilitate substantially uniform distribution of the agricultural product to each secondary line fluidly coupled to the first primary distribution line and the second primary distribution line.

* * * * *